United States Patent [19]
Wilkerson

[11] Patent Number: 5,379,709
[45] Date of Patent: Jan. 10, 1995

[54] AMPHIBIOUS ALL-TERRAIN TRACKLAYING VEHICLE

[76] Inventor: William F. Wilkerson, 100 SW. 4th St., Mulberry, Fla. 33860

[21] Appl. No.: 51,700

[22] Filed: Apr. 26, 1993

[51] Int. Cl.⁶ .............................................. B60F 3/00
[52] U.S. Cl. .................................... 114/61; 305/12
[58] Field of Search ................. 114/61, 270; 305/11, 305/12, 13

[56] References Cited

U.S. PATENT DOCUMENTS

| | | | |
|---|---|---|---|
| 4,449,758 | 5/1984 | Wohlford et al. | 305/12 |
| 4,846,092 | 7/1989 | Wilson | 114/270 |
| 4,961,395 | 10/1990 | Coast | 114/270 |
| 5,027,737 | 7/1991 | Duffty et al. | 114/270 |

Primary Examiner—Stephen P. Avila
Attorney, Agent, or Firm—Edward M. Livingston

[57] ABSTRACT

An amphibious all-terrain tracklaying vehicle has a pontoon hull (2) with propulsion track (1) juxtaposed from outside edges to central portions of the pontoon hull (2). A prime mover (11) and control center (22) are positioned on a deck framework (19) above the pontoon hull (2). Attachable optionally to the pontoon hull (2) are earth-moving, wetland-clearing, wetland-farming, snow-moving, rescuing, fire-fighting, spraying, cargo-transporting, personnel-transporting and other items (23). Track-cleaning and track-support elements which enable full-width juxtaposed track on a pontoon hull are provided.

37 Claims, 8 Drawing Sheets

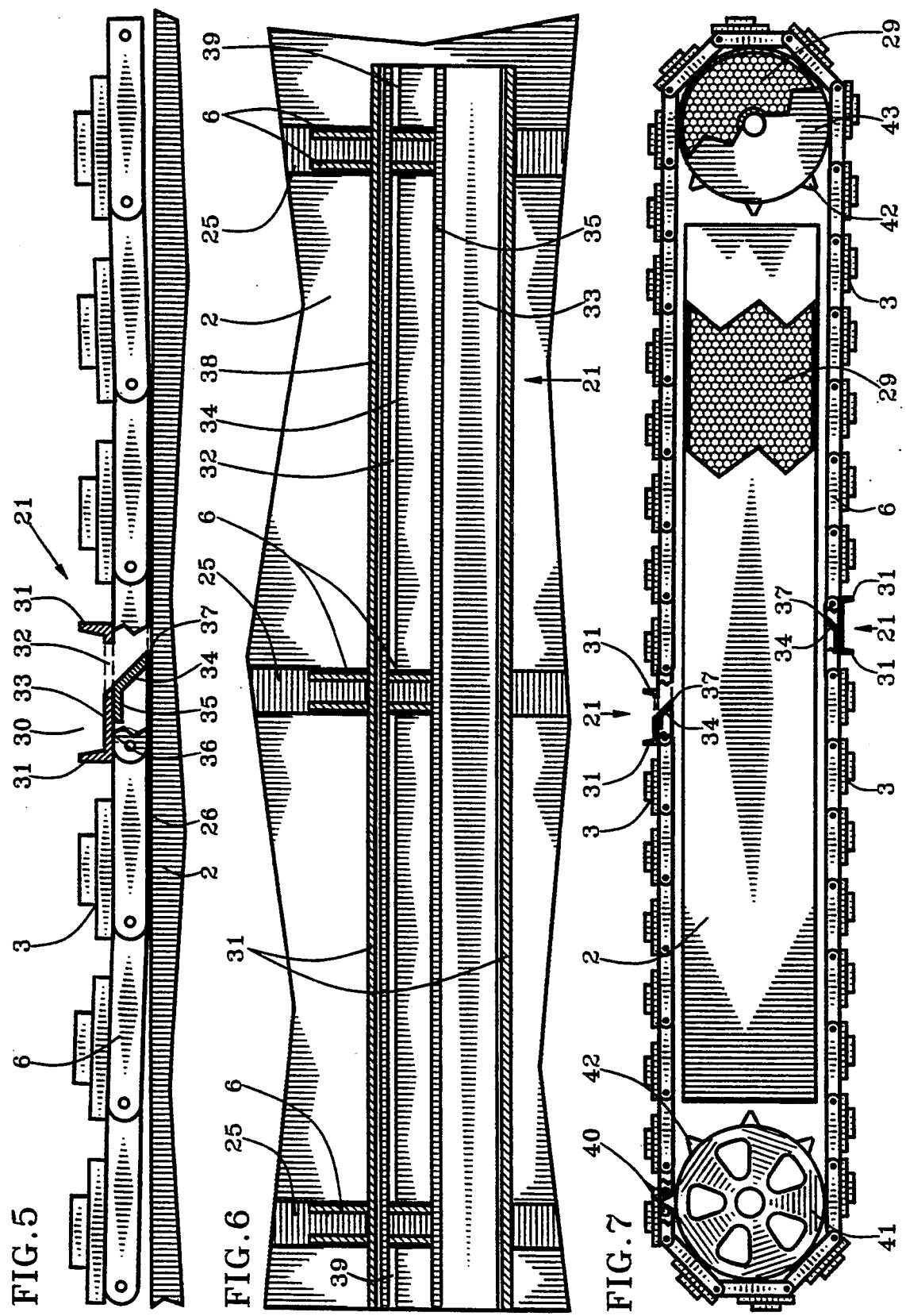

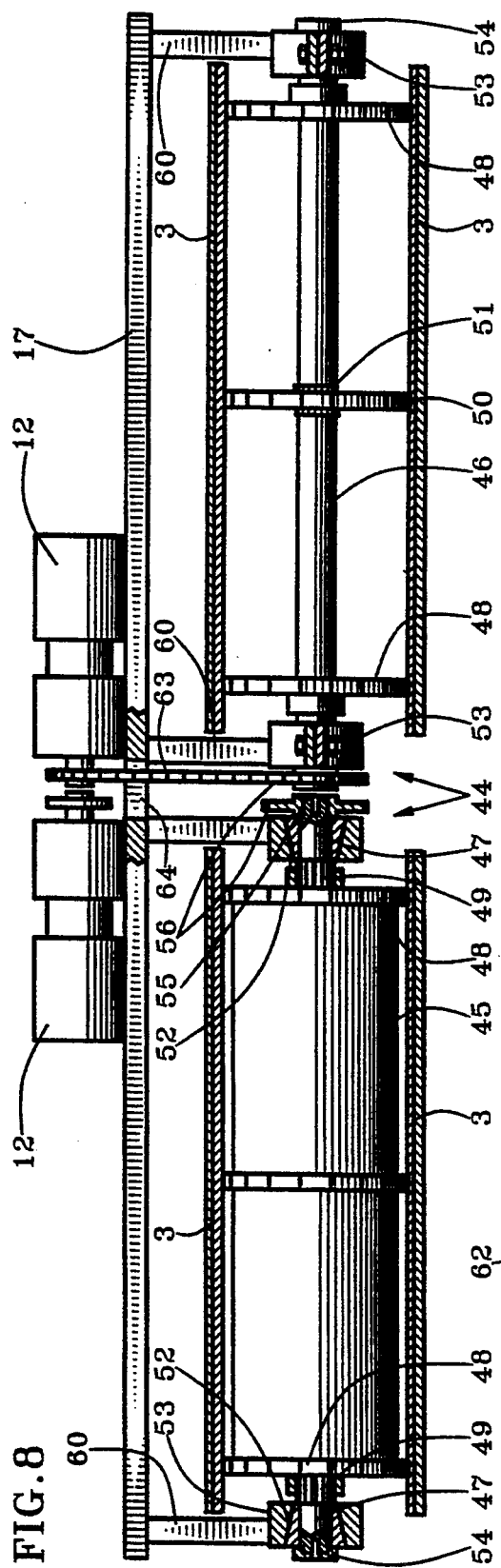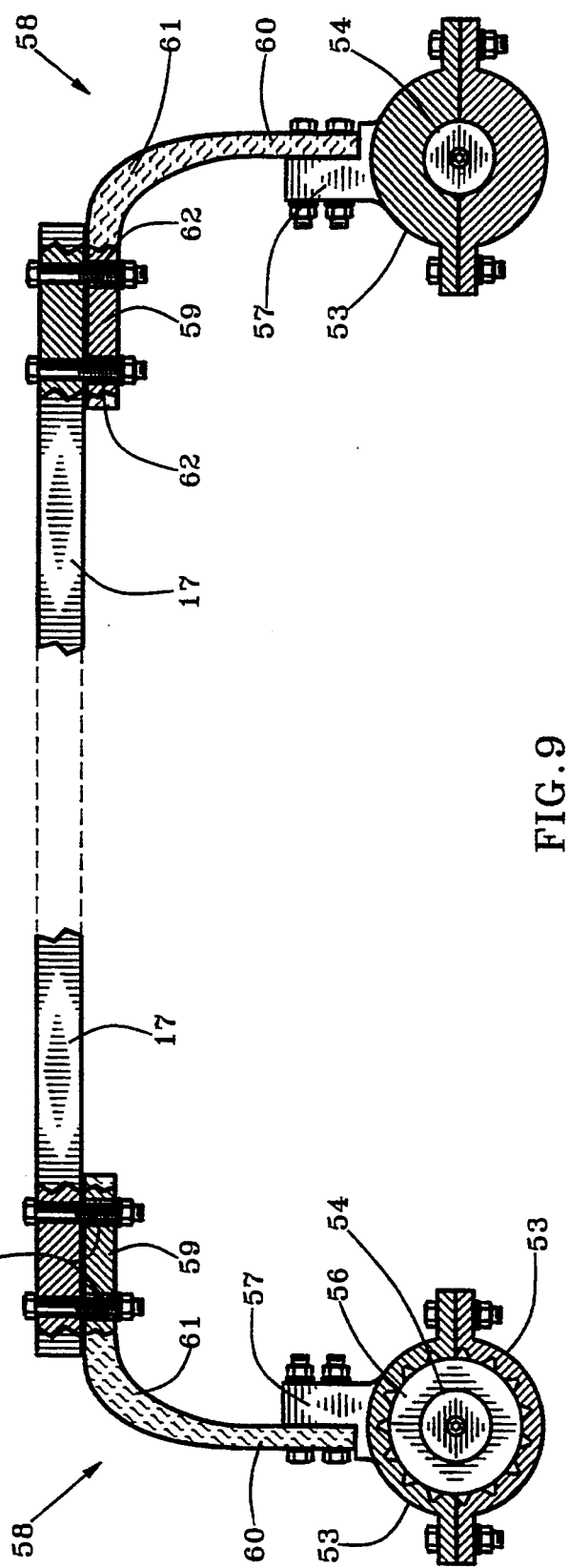
FIG.8
FIG.9

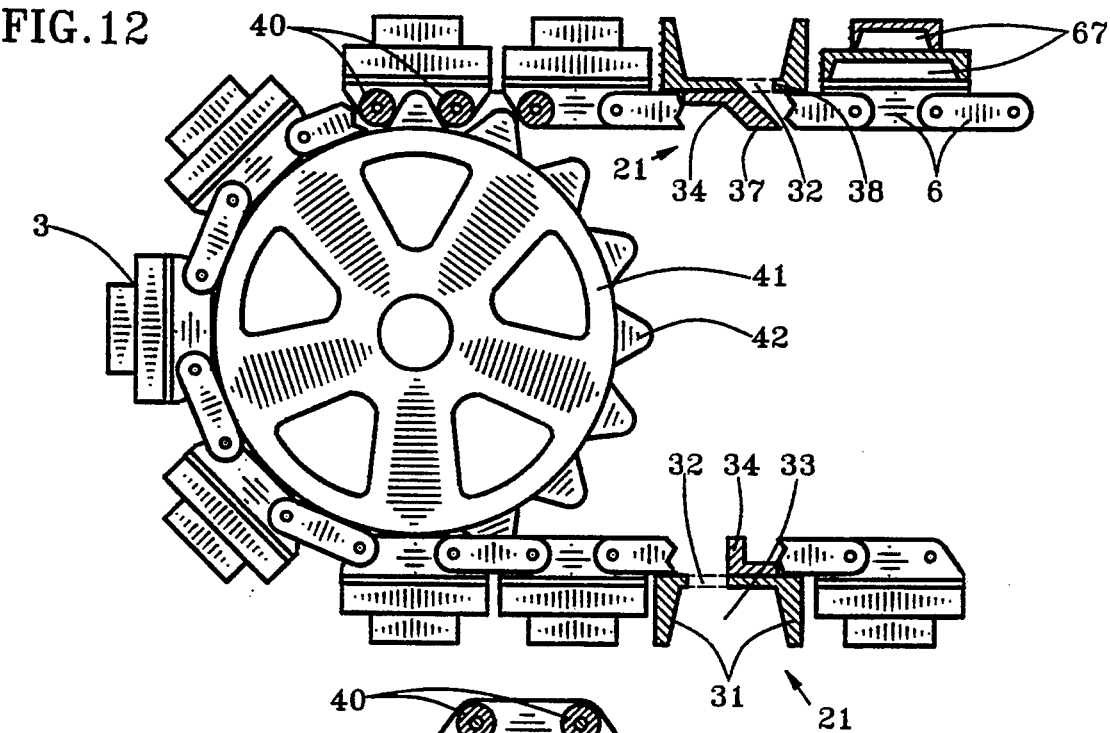
FIG.12
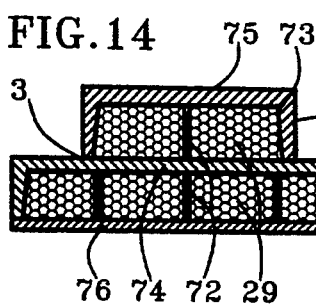
FIG.14
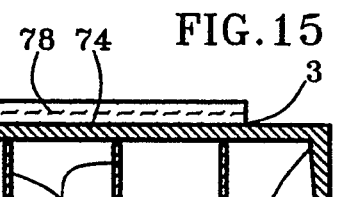
FIG.13
FIG.15
FIG.16
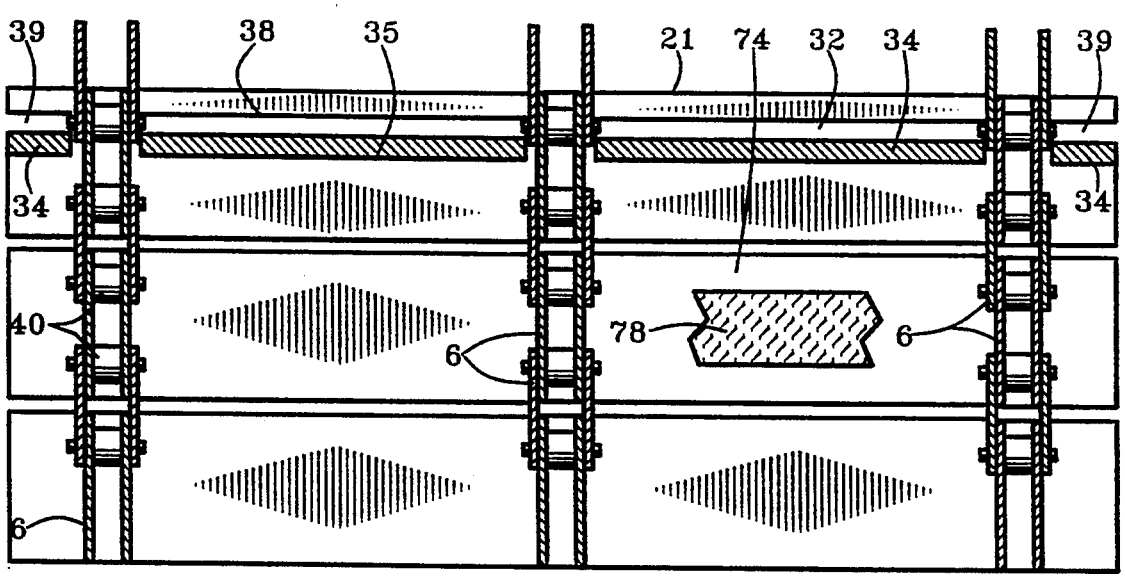

AMPHIBIOUS ALL-TERRAIN TRACKLAYING VEHICLE

BACKGROUND OF THE INVENTION

This invention relates to amphibious tracklaying vehicles.

Previous amphibian tracklaying vehicles have included a variety of military landing craft and wetland machinery. Military landing craft have tracks at opposite sides of an open barge-like hull. Different from this invention, the open barge-like hull is not an enclosed buoyant pontoon and the tracks are relatively narrow in order to allow loading and unloading of the hull between the tracks. Also known is a catamaran amphibious tracklaying vehicle having pontoon hulls joined in juxtaposed relationship. Propulsive traction was provided by a track on each pontoon. Conventional snow tractors also are different. They do not have a pontoon hull or buoyant frame, although they have tracks that are relatively wide but not full-width from side-to-center as in this invention. Tracklaying tractors in general are further yet different. They have neither a pontoon hull nor full-width side-to-center tracks as taught by this invention.

Wetland tractors have unique problems resulting from a buoyance necessity in combination with severe puncture conditions aggravated by high weight of buoyant hulls that are large enough and sturdy enough to support heavy-duty equipment. This is in addition to high traction requirements for operating in mud, slime and other slippery terrain conditions.

A wide variety of efforts have been made to solve numerous problems involved. U.S. Pat. No. 4,846,092 granted to Paul Wilson on Jul. 11, 1989 describes an amphibious tracklaying vehicle with at least one pontoon and buoyant cleats. The particular type of buoyant cleats it taught had a trapezoidal cross section in the form of a truncated triangle. While providing high structural integrity, the Wilson cleat tended to embed into soft surfaces and did not provide adequate buoyancy. Although the claims in the Wilson patent described at least one pontoon hull enveloped by an endless drive track, it did not teach a single pontoon hull enveloped by two endless drive tracks juxtaposed from side to center of a single pontoon hull. Nor did it teach either buoyant or non-buoyant step cleats on such a single-pontoon amphibious vehicle. Further, it did not teach a scraper cleat for removing gummy mud and related debris that obstruct movement of tracks. Also, it did not provide suspension for a deck positioned above a pontoon hull. Other known wetland and tracklaying vehicles are further yet different from the amphibious all-terrain tracklaying vehicle taught by this invention.

SUMMARY OF THE INVENTION

A principle objective of this invention is to provide a wetland amphibious tracklaying vehicle for clearing, draining, tilling and otherwise working swamps and marshlands.

Another objective is to provide an amphibious tracklaying vehicle for spraying, planting, cultivating and harvesting wetland plants and crops.

Another objective is to provide an earth-moving amphibious tracklaying vehicle that can be operated on wet and muddy lands.

Another objective is to provide an amphibious tracklaying vehicle for surface mining of wetlands, slime ponds, marshlands and surrounding areas.

Another objective is to provide a unitary-pontoon-hull amphibious tracklaying rescue and fire-fighting vehicle that can be operated in snow, ice, water, marsh, jungle, desert, rocky and other generally formidable conditions.

Yet another objective of this invention is to provide a unitary-pontoon-hull amphibious tracklaying vehicle that can be used to transport people and cargo in various combinations of snow, ice, water, marsh, jungle, desert, rocky and other generally formidable conditions.

This invention accomplishes the above and other objectives with an amphibious all-terrain tracklaying vehicle having a pontoon hull with endless track juxtaposed from outside edges to central portions of the pontoon hull. A prime mover and control center are positioned on a deck framework above the pontoon hull. Attachable optionally to the pontoon hull are earth-moving, wetland-clearing, wetland-farming, snow-moving, rescuing, fire-fighting, praying, cargo-transporting, personnel-transporting and other items. Track-cleaning and track-support means which enable full-width juxtaposed track on a pontoon hull are provided.

BRIEF DESCRIPTION OF THE DRAWINGS

This invention is described by appended claims in relation to description of a preferred embodiment with reference to the following drawings wherein:

FIG. 5 is a cutaway sectional view of a portion of track which illustrates a scraper for cleaning the pontoon hull of mud and related debris;

FIG. 6 is a sectional top view of a scraper cleat in relation to a top surface of the pontoon hull;

FIG. 7 is a sectional side view of a track and pontoon section;

FIG. 8 is a partial cutaway view of a rear drive section with optional buoyant sprocket wheels and with central drive means;

FIG. 9 is a partial cutaway side view of an optional suspension which provides tensioning of the track for particular applications;

FIG. 12 is a sectional view of a sprocket gear in relation to a drive chain, scraper cleats and buoyant cleats;

FIG. 13 is an end view of an inverted step cleat;

FIG. 14 is a cross-sectional view of a buoyant cleat with a buoyant final step;

FIG. 15 is a cross-sectional view of a buoyant cleat with a non-buoyant traction cap that can be rubber or other resilient member for particular applications;

FIG. 16 is a partial cutaway view of a section of track and drive chains from a side to which the drive chains are attached.

DESCRIPTION OF THE PREFERRED EMBODIMENTS

Figure 1:
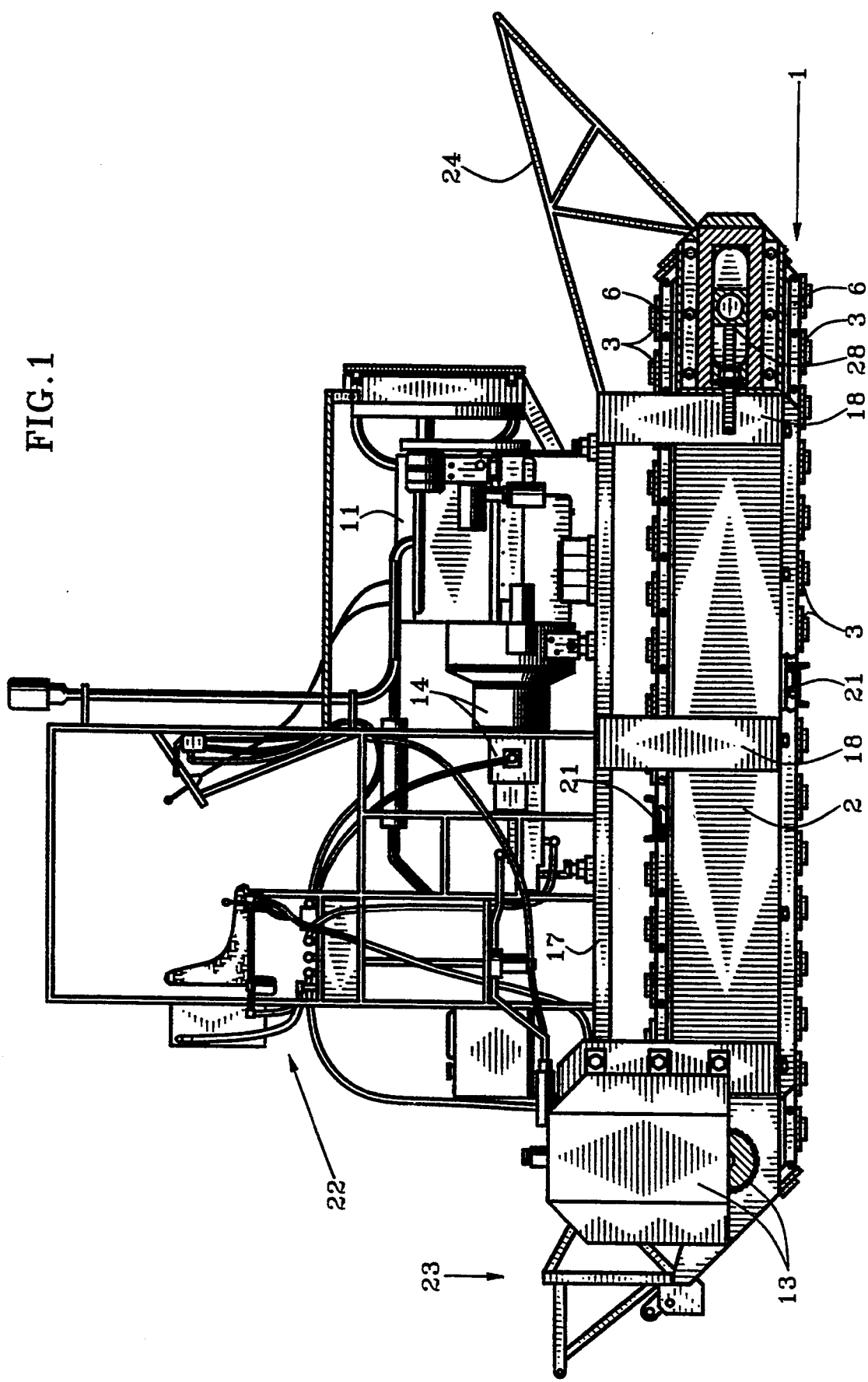
FIG. 1 is a side view of a wetland-working embodiment of this amphibious all-terrain vehicle.
Figure 2:
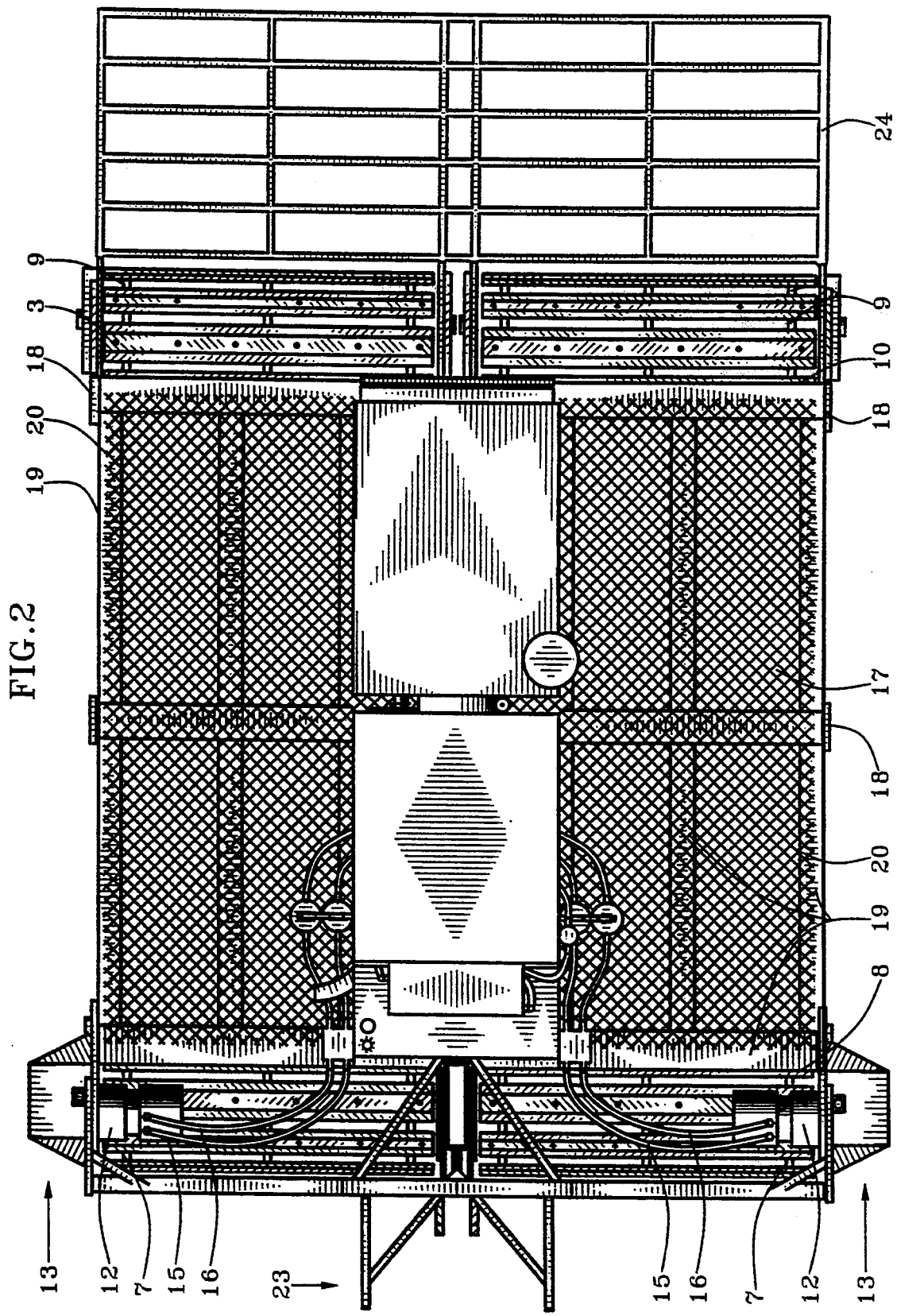
FIG. 2 is a top view of the FIG. 1 illustration.
Figure 3:
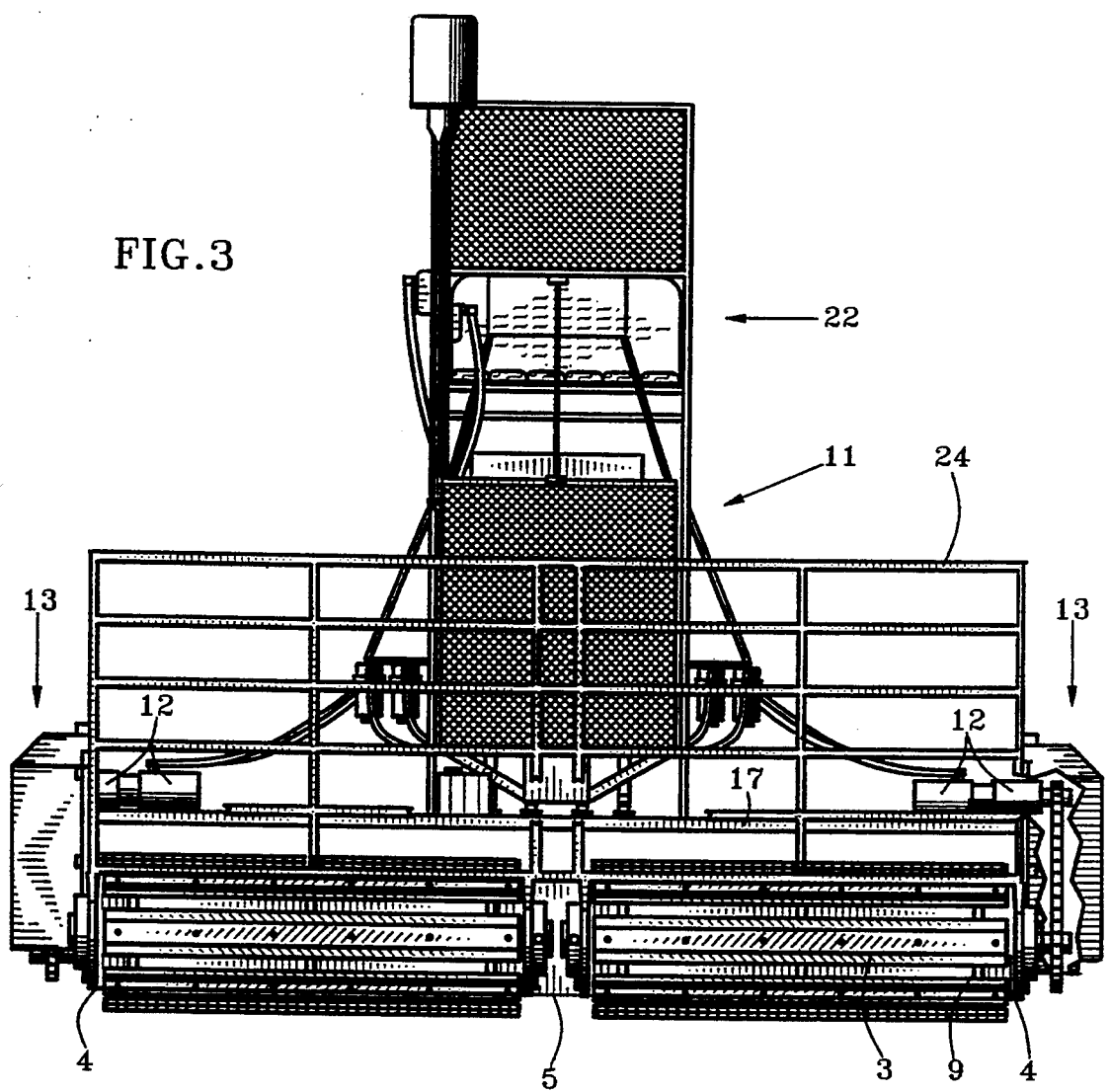
FIG. 3 is a partial cutaway front view of the FIG. 1 illustration.

Reference is made first to FIGS. 1-4 in relation to the overall system. Endless tracks 1 are juxtaposed surrounding a pontoon hull 2. Step cleats 3, extending proximately from hull sides 4 to a hull center section 5, are attached to track chains 6. The track chains 6 are positioned on track-drive sprocket wheels 7 proximate an aft end 8 of the pontoon hull 2 and on front sprocket wheels 9 proximate a front end 10 of the pontoon hull 2 in track-rotation relationship. Rotational power can be supplied to the endless tracks 1 from a prime mover 11 through power-transmission motors 12 and chain-drive gearing 13.

Power-transmission motors 12 can be hydraulic motors and the prime mover 11 can be a diesel engine for many heavy-duty applications. For hydraulic power transmission, hydraulic pressure can be supplied from a hydraulic pump 14 through hydraulic supply lines 15 and returned through hydraulic return lines 16. Hydraulic power transmission is convenient to control. However, other types of prime movers and other types of power-transmission means are foreseeable for various applications and with developments of power technology.

A deck 17 is supported above the pontoon hull 2 with deck supports 18 that are attached to the pontoon hull 2 beyond sides of the endless tracks 1. The deck 17 can be constructed with deck frame members 19 and overlaid with a deck screen 20. Other construction also is foreseeable. The deck 17 is positioned at a sufficient distance above the pontoon hull 2 to allow traverse of the tracks 1 between the pontoon hull 2 and the deck 17 and to allow passage of material carried by the tracks 1.

Material such as mud and debris carried by the tracks 1 is scraped from the pontoon hull by scraper cleats 21 and carried to ends of the tracks 1 before it accumulates sufficiently to obstruct travel of the tracks 1. Cleaning action of one or more of the scraper cleats 21 on the endless tracks 1 facilitates use of a wide flotation type of step cleat 3 that can be either buoyant or non-buoyant and that can have either rigid or resilient outer surfaces. The scraper cleats 21 and the step cleats 3 are described further in relation to FIGS. 5-7 and 12-16.

Positioned on the deck 17 in addition to the prime mover 11 and power transmission motors 12 can be a control area 22. Attached variously to the deck 17 and to the pontoon hull 2 can be machinery attachments 23 at the aft end 8 and different types of machinery, such as a marsh rake 24 at the front end 10.

Chain grooves 25 are provided in top surfaces 26 and bottom surfaces 27 of the pontoon hull 2. Depth of the chain grooves 25 can be greater than height of the track chains 6 in order to prevent contact of the track chains 6 with the pontoon hull 2. Instead, contact of the step cleats 3 with the pontoon hull 2 prevents contact by the track chains 6.

There is no contact of the cleats 3 with the hull 2 under normal operating conditions, owing to tightness of the track chains 6 on the sprocket wheels 7 and 9. However, sufficient tightness to prevent contact under all operating conditions causes adverse power loss and wear from friction. Also, even minute wear causes significant loosening of the chains 6. A sprocket adjuster 28 can be positioned on the front 10 of the pontoon hull 2 to adjust distance between the front sprocket wheels 9 and the track-drive sprocket wheels 7. The sprocket adjuster 28 can be a threaded mechanism as illustrated. A resilient sprocket adjuster for particular embodiments of this invention is described in relation to FIGS. 8-11.

This invention makes use of the slippery mud, marsh, snow and ice, the yielding nature of sand and the viscous nature of water with full-bottom traction. Tracklaying vehicles that operate on dry surfaces require greater distances between tracks for turning torque of one track against the other. Tracklaying snow vehicles can have less distance between tracks partly because of the viscosity of snow on which they travel. In the same way that the yielding nature of snow makes wide tracks necessary and the viscosity of the snow makes them possible, the slippery and yielding nature of combinations of mud, marsh and water make necessary and possible the full-bottom traction of this amphibious all-terrain tracklaying vehicle.

In addition to full-bottom traction, the side-to-center tracks 1 also prevent entry of objects into the pontoon hull 2. The step cleats 3 can be positioned close together to prevent entry of objects between them and still provide traction with the final step of the step cleats. In addition, the step cleats can be constructed ruggedly and buoyant. Resilient surfaces also can be provided for particular use conditions.

Figure 4:
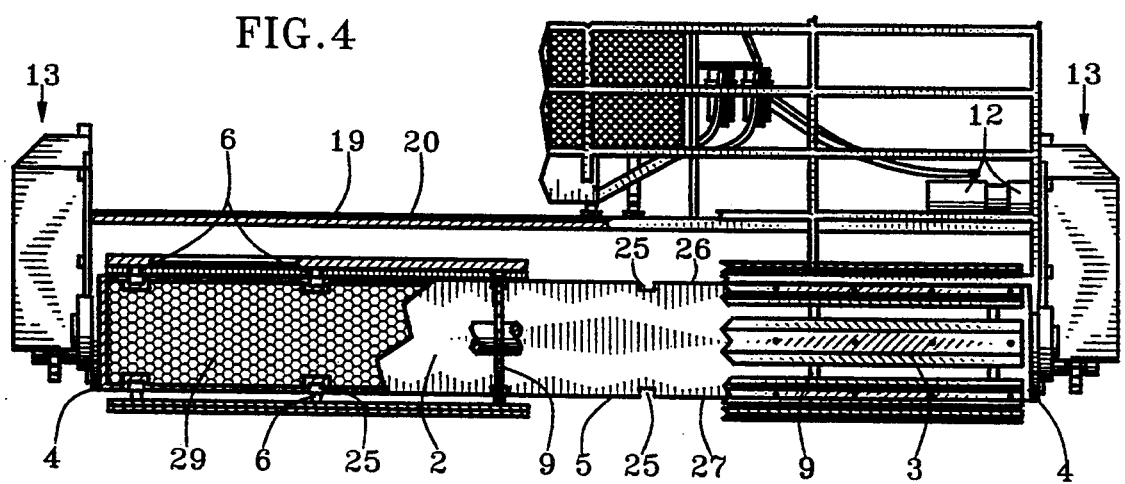
FIG. 4 is a cutaway view of a frontal section.

The pontoon hull 2 can be filled with light filler material 29 that prevents passage of water throughout the pontoon hull. This is illustrated in FIG. 4 by a honeycomb representation.

Referring now to FIG. 5, the scraper cleat 21 can have a load channel 30 between channel walls 31 and a cleaning orifice 32 in a channel floor 33. A scraper blade 34 can be attached to a pontoon side of the scraper cleat 21 and extended in a direction towards the pontoon hull 2. For cleaning the top surface 26 and bottom surface 27 of the pontoon hull 2 during forward travel of the vehicle, the scraper blade 34 can be attached to an aft side 35 of the cleaning orifice 32 and a rake angle of the scraper blade 34 can be positive in the direction of travel of the cleat 21. The cleaning orifice 32 can be positioned proximate a front side of the channel floor 33 in order to allow accumulation of scraped material in a relatively large portion of the load channel 30. The rake angle can be neutral at perpendicularity to the channel floor 33 to provide cleaning in both directions of travel. However, the cleaning action would be diminished. For this reason, it is preferable to have either two oppositely-disposed scraper cleats 21 with positive-rake blades 34 or to have one with a positive rake in one direction and the other with a positive rake in the opposite direction of travel of the tracks The track chain 6 tends to arc towards the pontoon hull 2, leaving less distance between the pontoon hull 2 and the track chain 6 between ends as illustrated. The track chain 6 is shown above the surface of the pontoon hull 6, rather than in a chain groove. The length of the scraper blade 34 can be constructed in accordance with desired penetration of the track chain 6 into a chain groove 25, shown in FIG. 4, before contact of the scraper blade 34 is made with a surface 26 or 27 of the pontoon hull. The scraper blade 34 will ride on the pontoon hull 2 instead of a bottom side of the step cleats 3 because the scraper blade 34 is extended from a pontoon side 36 of the channel floor 33 of the scraper cleat 21. Consequently, a scraper contact surface 37 and the rake angle of the scraper blade 34 are critical. It is preferable that the scraper contact surface 37 be sufficiently wide to prevent cutting into the pontoon hull.

Referring to FIG. 6, the cleaning orifice 32 has a front side 38, an aft side 35 and ends proximate the track chains 6 or the means of connection of the chains 6 to the scraper cleat 21. The scraper blade 34 can be positioned to leave a select gap between the scraper blade 34 and the front side 38 of the cleaning orifice 32 as shown. Alternatively, the scraper blade 34 can be positioned further ahead to cover completely the cleaning orifice 32, leaving only the positive-rake surface of the scraper blade 34 covering the cleaning orifice 32. This prevents entry of any objects vertically into the cleaning orifice 32. Only objects lifted by the positive rake of the scraper blade 34 would pass through the cleaning orifices 32. Cleaning notches 39 are extensions of the cleaning orifices 32 at outside edges of the outside track chains 6. They are referred to as notches rather than orifices because they have an open wall. The channel walls 31 contain scraped material between them as well as to provide continuity of traction and protection of the pontoon hull 6 from puncture.

In FIG. 7, scraper cleats 21 are shown oppositely directed in relation to direction travel and oppositely disposed in position on a track chain 6. This allows cleaning in both directions of travel of the vehicle. Owing to repetition of directional change for particular use conditions, this can be a preferred construction for certain applications. The track chain 6 can be comprised of unitary links with drive slots 40 for some forms of this invention. An alternative form of track chain 6 is described in relation to FIGS. 12–16. Sprocket wheels 7 and 9 can be buoyant as shown from an end view at the right side of FIG. 7 and described further in relation to FIGS. 8–12. Whether either or both sprocket wheels 7 and 9 are buoyant or not, a non-buoyant section 41 of the sprocket wheels 7 and 9 from which sprocket teeth 42 are extended can be non-buoyant as illustrated at the left side of FIG. 7. The pontoon hull 2 and buoyant sprocket wheels 43 can be filled with light filler material 29.

Referring to FIGS. 8 and 9, width of central chain-drive gearing 44 can be made comparable to conventional non-geared attachments to decrease overall width and to remove vehicle projections for particular embodiments of this invention. Sprocket adjustment can be both resiliently automatic and manual in the same small central-drive area. This can be accomplished with an axle arrangement using a buoyant double-ended axle 45 or alternatively a non-buoyant double-ended axle 46. A bearing section 47 is provided on each end of either axle 45 or 46. Replaceable sprocket plates 48, when used, are positioned on a spline step 49 adjacent to the bearing section 47. When a replaceable center sprocket plate 50 is used, it is positioned on a central sprocket step 51 before positioning sprocket plates 48 on spline steps 49. With either replaceable or fixed sprocket plates 48, having approximately the same dimensions and attachable either fixedly or removably in approximately the same position, in place, a bearing 52, preferably but not necessarily a coned roller bearing, is positioned on each bearing section 47. The bearing 52 is housed in a preferably a double-half-shell housing 53. A bearing keeper 54 can be fit onto both ends of the shaft when used in the position of a front sprocket wheel 9 illustrated in FIG. 1. When used as a track-drive wheel 7, however, an intended drive end of axle 45 or 46 is provided with a gear spline section 55 adjacent to the bearing section 47. The bearing keeper 54 can be held in position by one or more fastener bolts threaded into each end of axle 45 or 46. A splined gear sprocket 56 is positioned on the gear spline section 55 and held in place by a bearing keeper 54 the same as non-drive ends of axles 45 or 46. The splined gear sprocket 56 and the bearing keeper 54 can be constructed in one piece. A suspension-attachment section 57 can be extended from a top half of the double-half-shell housing 53.

This axle structure allows convenient assembly, repair and replacement. It can be made as large and strong or as small and light as required by use conditions. A unique advantage is that it allows positioning of a drive sprocket at either the center or outsides of the pontoon hull.

A deck suspension means 58 can be a spring member having a horizontal section 59 attachable to the deck 17, a vertical section 60 attachable to the suspension-attachment section 57 of the double-half-shell housing 53 and a quarter-circle-arc section 61 between the horizontal section 59 and the vertical section 60. The quarter-circle-arc section 61 can be thick and sturdy enough to prevent it from bending with weight or pressure applied vertically as designed.

In this structure, pressure applied on the quarter-circle-arc section 61 is nearly all compressive, such that there will be no vertical yield. The vertical section 60, however can yield resiliently in an arc that provides only slight travel that is substantially linear to the pontoon hull 2 and the deck 17. This provides a form of resiliently-automatic sprocket adjustment. It can compensate for wear and for severe use conditions. Further, linear resilience is preferable for tensioning endless tracks.

The horizontal section 59 can be positioned linearly for manual sprocket adjustment by such means as elongate fastener orifices 62 in either the horizontal section 59 or in the deck 17. Other manual sprocket-adjustment means are foreseeable. Mere shimmying between the vertical section 60 and the suspension-attachment section 57 is another reliable although cumbersome method of manual sprocket adjustment. With this deck suspension means 58, however, the need for manual adjustment can be infrequent and minimal.

This suspension means 58 also can be constructed to meet needs of use conditions. For backhoe, power-shovel, dragline, derrick and other heavy-duty work, it can be constructed to meet particular requirements. For such uses as rescue work, personnel transport, cargo transport, snow transportation, desert transportation, military all-terrain use, fire-fighting, spraying and civilian all-terrain applications, it can be made appropriately light and flexible.

When used with center drive, power-transmission motors 12 can be positioned on an aft section of the deck 17. Gear-driven chains 63 can be positioned in appropriate chain orifices 64 if the power-transmission motors 12 or direct-drive prime movers are positioned forward from the aft end of the deck 17.

Figure 10:
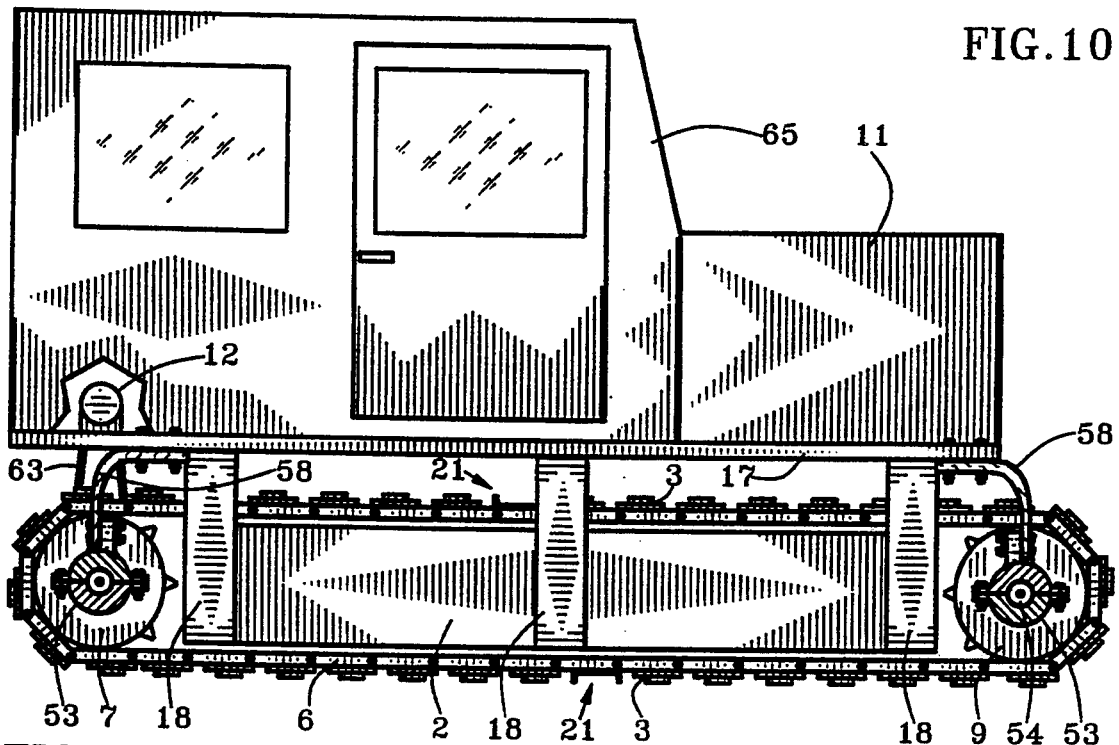
FIG. 10 is a partial cutaway side view of a cabin embodiment for all-terrain transport of personnel and cargo.
Figure 11:
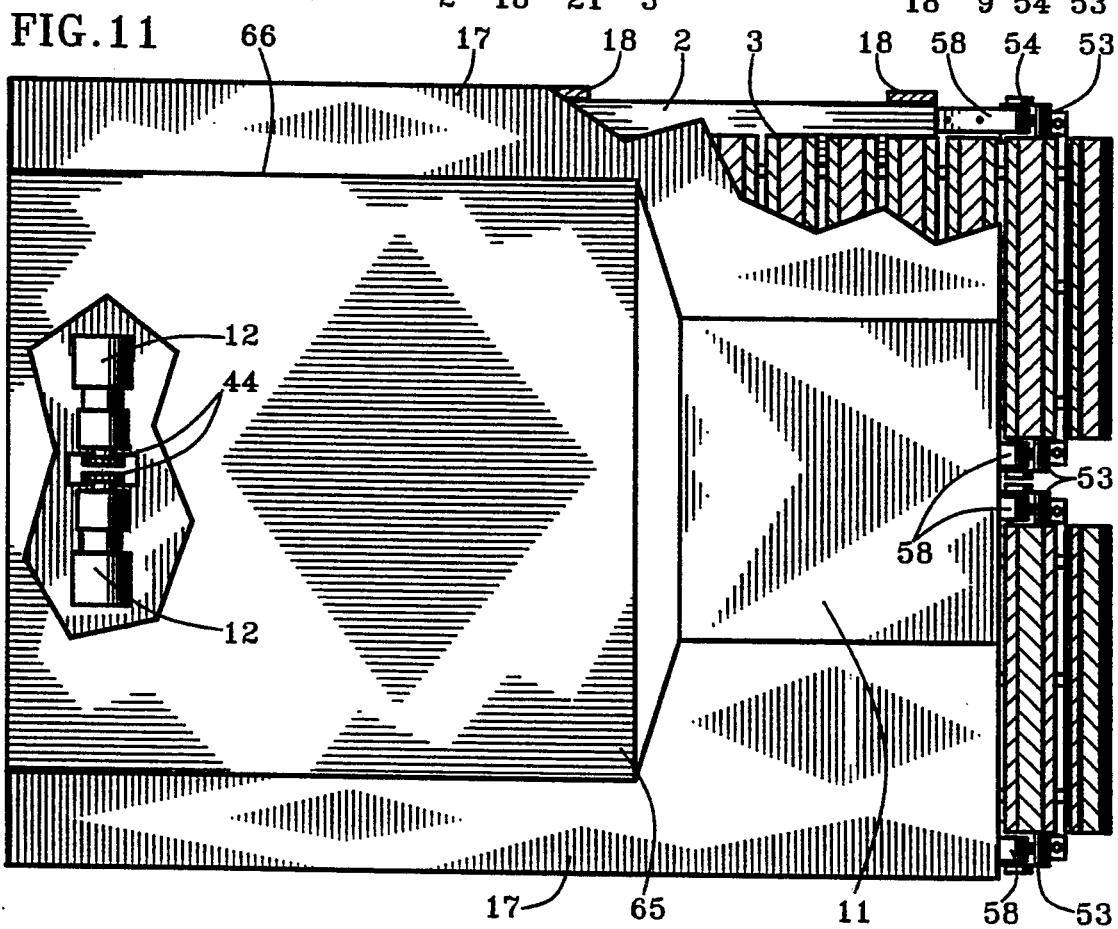
FIG. 11 is a top view of the FIG. 10 illustration.

Reference is made now to FIGS. 10 and 11. The deck 17 can be attached to the pontoon hull 2 with the deck supports 18 whether using the deck suspension means 58 or not. A cabin 65 on the deck 17 can have personnel and cargo areas 66 sized and shaped to meet various needs. The deck 17 can be constructed wide enough to protect the endless tracks 1 and to provide activity area. Other factors are as described in relation to FIGS. 1–4 and 8–9.

Referring to FIG. 12, a scraper blade 34 having positive rake which covers a cleaning orifice 32 vertically although leaving it open at an angle between the scraper blade 34 and the front side 38 of the cleaning orifice. Oppositely disposed on the track chain 6 is a scraper blade 34 having a neutral rake that is perpendicular to the track chain 6. The neutral-rake scraper blade leaves the cleaning orifice open vertically and does not provide an incline plane for transport of scraped material. A variety of track chains 6 are foreseeable. Two different types are illustrated.

On the same track chain 6 is shown a cross section of step cleats 3 having hollow step interiors 67 for buoyancy or light weight per traction. Buoyancy requires larger steps and also provides greater traction per weight of cleats.

Referring to FIG. 13, a base step 68 of a step cleat 3 can be constructed of a different material than a final step 69. Both can be solid or rigid material. For some applications, however, it may be desirable for the final step to be a resilient material such as rubber.

Referring to FIG. 14, a step cleat 3 can have a hollow buoyant base step 70 and a hollow buoyant final step 71 filled with light filler material 29 to prevent passage of fluid from a puncture area to other portions of the buoyant steps. Vertical braces 72 can be provided in either or in both as desired to resist collapse from weight and impact. Corner braces 73 can be provided where and as needed to resist corner pressure. The outside walls 74 and 75 can be thicker than a base wall 76 to provide greatest puncture resistance per weight of the step cleats 3.

Referring to FIG. 15, a step cleat 3 can have a hollow buoyant base step 77 without filler material. A rubber or other resilient final step 78 can be provided on this base step 77 or on any other base step. Rubber final steps 78 on thick, hollow base steps 77 can be most appropriate for personnel and cargo transportation on various swamp, jungle, snow and water surfaces for military and civilian uses.

Referring to FIGS. 16 and 12, a drive-chain side of step cleats 3 and a scraper cleat 21 reveals the scraper blade 34 covering a portion of the cleaning orifices 32 and cleaning notches 39. A cutaway in a base cleat 74 shows a resilient final step 78 that can be used in conjunction with either type of base step. Also illustrated is relatively close positioning step cleats 3 and scraper cleats 21 to protect the pontoon hull 2 against rupture by objects in the use conditions. Close positioning of the cleats 6 and 21 is possible without sacrificing either traction or broad-surface flotation effect as a result of spacing of the final steps sufficiently for traction to be provided by their separated edges.

Figure 17:
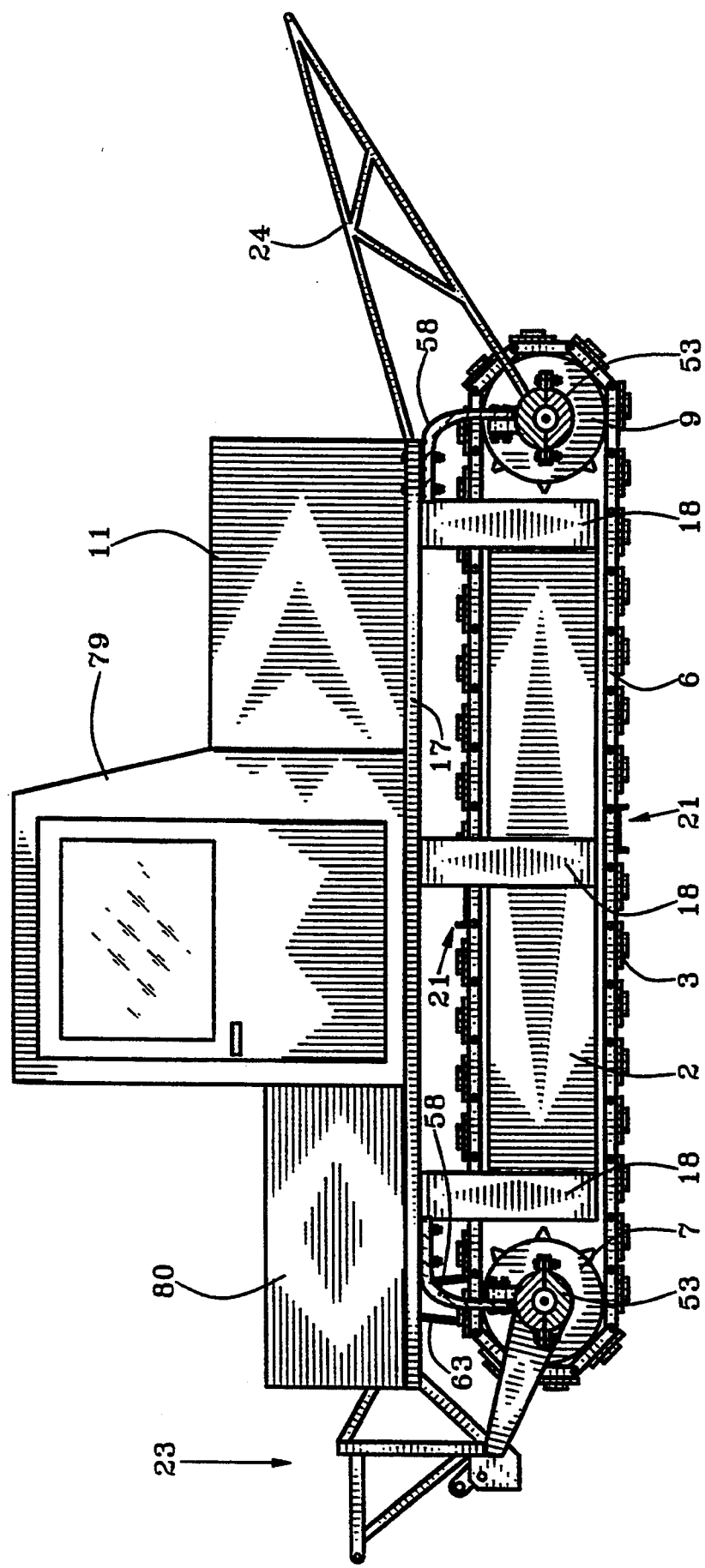
FIG. 17 is a side view of a marsh-working embodiment having an adjustable resilient suspension means.

Referring to FIG. 17, machinery attachments 23 can be connected to the double-half-shell housing 53 and to the deck 17 as desired for rigidity with either type of suspension. A marsh rake 24 or other front-end machinery can be connected also to the double-half-shell housing 53 and to the deck 17 for either type of suspension means as desired. An operator cabin 79 can be positioned on the deck 17 for particular applications. Transmission motors, tanks, pressure lines and related mechanisms can be protected in an equipment bed 80.

A new and useful amphibious all-terrain tracklaying vehicle having been described, all such modifications, adaptations, substitutions of equivalents, combinations of components, applications and forms thereof as described by the following claims are included in this invention.

I claim:

1. An amphibious all-terrain tracklaying vehicle comprising:
   a pontoon hull; two endless tracks surrounding the pontoon hull linearly in juxtaposed relationship;
   step cleats on the endless tracks extended from proximate each side to proximate a linear center of the pontoon hull;
   track chains attached to the endless tracks in chain-drive relationship;
   track-drive sprocket wheels in track-rotation relationship to the track chains and to a rotational power source at an aft end of the pontoon hull;
   front sprocket wheels in rotational track-support relationship to the track chains at a front end of the pontoon hull;
   a deck positioned vertically above the pontoon hull such that the endless tracks are traversable between the pontoon hull and the deck;
   a plurality of at least three track chains on each endless track;
   at least one scraper cleat having a cleaning orifice extended between each track chain, making a total of at least two scraper blades; and
   a scraper blade extended from a pontoon side of the scraper cleat at a position proximate a linear-traverse side of each of the cleaning orifices, making a total of at least two scraper blades.

2. An amphibious all-terrain tracklaying vehicle as described in claim 1 wherein the scraper blades are positioned on aft sides of the cleaning orifices.

3. An amphibious all-terrain tracklaying vehicle comprising:
   a pontoon hull;
   two endless tracks surrounding the pontoon hull linearly in juxtaposed relationship;
   step cleats on the endless tracks extended from proximate each side to proximate a linear center of the pontoon hull;
   track chains attached to the endless tracks in chain-drive relationship;
   track-drive sprocket wheels in track-rotation relationship to the track chains and to a rotational power source at an aft end of the pontoon hull;
   front sprocket wheels in rotational track-support relationship to the track chains at a front end of the pontoon hull;
   a deck positioned vertically above the pontoon hull such that the endless tracks are traversable between the pontoon hull and the deck;
   a plurality of at least three track chains on each endless track;
   at least two scraper cleats with each having a cleaning orifice extended between each track chain, making a total of at least two cleaning orifices in each of the scraper cleats;
   a scraper blade positioned on an aft side of the cleaning orifices of at least one scraper cleat and extended from a pontoon side of such scraper cleat; and
   a scraper blade positioned on a front side of the cleaning orifices of at least one scraper cleat extended from a pontoon side of such scraper cleat.

4. An amphibious all-terrain tracklaying vehicle as described in claim 3 and further comprising:
   a cleaning slot in each end of each scraper cleat;
   the cleaning slot being parallel to the cleaning orifice in each scraper cleat and extended to proximate an adjacent track chain; and a scraper blade positioned on an aft side of each cleaning slot of the scraper cleats and extended from a pontoon side of such scraper cleats.

5. An amphibious all-terrain tracklaying vehicle as described in claim 3 wherein the scraper blade has a positive-rake angle in a direction of traverse of the endless track for forward travel of the amphibious all-terrain tracklaying vehicle.

6. An amphibious all-terrain tracklaying vehicle comprising:
   a pontoon hull;
   two endless tracks surrounding the pontoon hull linearly in juxtaposed relationship;
   step cleats on the endless tracks extended from proximate each side to proximate a linear center of the pontoon hull;
   track chains attached to the endless tracks in chain-drive relationship;
   track-drive sprocket wheels in track-rotation relationship to the track chains and to a rotational power source at an aft end of the pontoon hull;
   front sprocket wheels in rotational track-support relationship to the track chains at a front end of the pontoon hull;
   a deck positioned vertically above the pontoon hull such that the endless tracks are traversable between the pontoon hull and the deck;
   at least two scraper cleats with each cleat having a cleaning orifice extended between each track chain, making a total of at least two cleaning orifices in each of the scraper cleats; and
   a scraper blade positioned on an aft side of each of the cleaning orifices of the scraper cleats and extended from a pontoon side of such scraper cleat.

7. An amphibious all-terrain tracklaying vehicle as described in claim 6 and further comprising:
   a cleaning slot in each end of each scraper cleat;
   the cleaning slot being parallel to the cleaning orifice in each scraper cleat and extended to proximate an adjacent track chain; and
   a scraper blade positioned on an aft side of each cleaning slot of the scraper cleats and extended from a pontoon side of such scraper cleats.

8. An amphibious all-terrain tracklaying vehicle as described in claim 6 wherein the scraper blade has a positive-rake angle in a direction of traverse of the endless track for forward travel of the amphibious all-terrain tracklaying vehicle.

9. An amphibious all-terrain tracklaying vehicle as described in claim 7 wherein the scraper blade has a positive-rake angle in a direction of traverse of the endless track for forward travel of the amphibious all-terrain tracklaying vehicle.

10. An amphibious all-terrain tracklaying vehicle comprising:
    a pontoon hull;
    two endless tracks surrounding the pontoon hull linearly in juxtaposed relationship;
    step cleats on the endless tracks extended from proximate each side to proximate a linear center of the pontoon hull;
    track chains attached to the endless tracks in chain-drive relationship
    track-drive sprocket wheels in track-rotation relationship to the track chains and to a rotational power source at an aft end of the pontoon hull;
    front sprocket wheels in rotational track-support relationship to the track chains at a front end of the pontoon hull;
    a deck positioned vertically above the pontoon hull such that the endless tracks are traversable between the pontoon hull and the deck; wherein the step cleats have at least two steps which are hollow for buoyancy, and wherein outside walls of the cleats having hollow steps are selectively thick to prevent puncture in use conditions.

11. An amphibious all-terrain tracklaying vehicle as described in claim 10 and further comprising:
    surface braces extended between outside walls and inside walls of the cleats having hollow steps; and
    angle braces at select angles of walls and surface braces.

12. An amphibious all-terrain tracklaying vehicle as described in claim 11
    a pontoon hull;
    two endless tracks surrounding the pontoon hull linearly in juxtaposed relationship;
    step cleats on the endless tracks extended from proximate each side to proximate a linear center of the pontoon hull;
    track chains attached to the endless tracks in chain-drive relationship;
    track-drive sprocket wheels in track-rotation relationship to the track chains and to a rotational power source at an aft end of the pontoon hull;
    front sprocket wheels in rotational track-support relationship to the track chains at a front end of the pontoon hull;
    a deck positioned vertically above the pontoon hull such that the endless tracks are traversable between the pontoon hull and the deck; wherein the track-drive sprocket wheels are positioned at outside ends of axles on which the sprocket wheels are rotational, such that distance between inside ends of the axles and inside edges of the endless tracks can be minimized in order to maximize width of the endless tracks between outside edges and a central section of the pontoon hull.

13. An amphibious all-terrain tracklaying vehicle as described in claim 12 wherein the rotational power source is a power-transmission motor having a motor sprocket wheel and drive chain in chain-drive relationship to a track-drive sprocket wheel proximate each aft corner of the pontoon hull.

14. An amphibious all-terrain tracklaying vehicle as described in claim 12 wherein the deck is positioned above the pontoon hull by means of rigid suspension members attached to sides of the pontoon hull and extended from the pontoon hull to the deck.

15. An amphibious all-terrain tracklaying vehicle comprising:
    a pontoon hull;
    two endless tracks surrounding the pontoon hull linearly in juxtaposed relationship;
    step cleats on the endless tracks extended from proximate each side to proximate a linear center of the pontoon hull;
    track chains attached to the endless tracks in chain-drive relationship;
    track-drive sprocket wheels in track-rotation relationship to the track chains and to a rotational power source at an aft end of the pontoon hull;

front sprocket wheels in rotational track-support relationship to the track chains at a front end of the pontoon hull;

a deck positioned vertically above the pontoon hull such that the endless tracks are traversable between the pontoon hull and the deck;

a track-drive sprocket wheel having a double-ended axle with a bearing member positional on a bearing section of each end of the double-ended axle;

an axle step to which a track-drive sprocket wheel is attachable rigidly adjacent to each bearing section;

a bearing housing attachable to each bearing member by means of matching half-shells;

an axles keeper attachable to each end of the double-ended axle by means of at least one fastener bolt threadable into each end of the double-ended axle; and deck suspension means attachable to each bearing housing.

16. An amphibious all-terrain tracklaying vehicle as described in claim 15 wherein the axle keeper attachable to at least one end of the double-ended axle is a drive-chain sprocket wheel having sprocket teeth engageable with a drive chain in chain-drive relationship to the rotational power source.

17. An amphibious all-terrain tracklaying vehicle as described in claim 15 wherein the deck suspension means is a spring member having a horizontal section attachable to the deck, a vertical section attachable to the bearing housing, a quarter-circle-arc section between the horizontal section and the vertical section that is sufficiently thick in proportion to length to resist vertical travel resulting from anticipated weight on the deck, and a vertical-spring section between the quarter-circle-arc section and the vertical section attachable to the bearing housing, the vertical-spring section being designed to provide desired tension in an arc tangent to vertical attachment of the spring member to the bearing housing.

18. An amphibious all-terrain tracklaying vehicle as described in claim 17 and further comprising:

the vertical section of such spring member attached to such bearing housing at each end of each of such double-ended axles at the front end and at the back end of the pontoon hull;

front spring members having the horizontal section attached to a front portion of the deck with the quarter-circle-arc section positioned forwardly from the horizontal section; and rear spring members having the horizontal section attached to an aft portion of the deck with the quarter-circle-arc section positioned rearwardly from the horizontal section.

19. An amphibious all-terrain tracklaying vehicle as described in claim 18 and further comprising:

deck-support members extended between the pontoon hull and the deck at positions outwardly selectively from edges of the endless tracks.

20. An amphibious all-terrain tracklaying vehicle as described in claim 19 wherein the double-ended axles are reversible end-to-end such that the drive-chain sprocket wheels are positional optionally on ends of the double-ended axles proximate either an aft center or proximate aft corners of the deck in chain-driven relationship to the rotational power source.

21. An amphibious all-terrain tracklaying vehicle as described in claim 20 and further comprising:

a weather-proof cabin on the deck.

22. An amphibious all-terrain tracklaying vehicle as described in claim 21 wherein the track-drive sprocket wheels are buoyant with an impermeable cylindrical housing extended between outside ends.

23. An amphibious all-terrain tracklaying vehicle as described in claim 20 and further comprising:

machinery attachments proximate the front and aft ends of the deck.

24. An amphibious all-terrain tracklaying vehicle as described in claim 20 and further comprising:

track-chain grooves in top and bottom surfaces of the pontoon hull.

25. An amphibious all-terrain tracklaying vehicle as described in claim 20 and further comprising:

linear adjustment means in linear-adjustment relationship between the horizontal section of the spring member and the deck.

26. An amphibious all-terrain tracklaying vehicle as described in claim 25 wherein the linear adjustment means is an elongate bolt orifice in the horizontal section of the spring member such that each horizontal member can be positioned as desired and then tightened in place with a fastener bolt inserted through the elongate bolt orifice to provide desired tension of the endless tracks.

27. An amphibious all-terrain tracklaying vehicle comprising:

a pontoon hull;

two endless tracks surrounding the pontoon hull linearly in juxtaposed relationship;

step cleats on the endless tracks extended from proximate each side to proximate a liner center of the pontoon hull;

track chains attached to the endless tracks in chain-drive relationship;

track-drive sprocket wheels in track-rotation relationship to the track chains and to a rotational power source at an aft end of the pontoon hull;

front sprocket wheels in rotational track-support relationship to the track chains at a front end of the pontoon hull;

a deck positioned vertically above the pontoon hull such that the endless tracks are traversable between the pontoon hull and the deck;

track-chain grooves in top and bottom surfaces of the pontoon hull;

at least one scraper cleat having at least one cleaning orifice;

at least one scraper blade extended from a pontoon side of the scraper cleat at a position proximate a linear-traverse side of the cleaning orifice;

a plurality of at least three track chains on each endless track;

at least two scraper cleats with each having a cleaning orifice extended between each track chain, making a total of at least two cleaning orifices in each of the scraper cleats;

a scraper blade positioned on an aft side of the cleaning orifices of at least one scraper cleat and extended from a pontoon side of such scraper cleat;

a cleaning slot in each end of each scraper cleat;

the cleaning slot being parallel to the cleaning orifice in each scraper cleat and extended to proximate an adjacent track chain; and a scraper blade positioned on an aft side of each cleaning slot of the scraper cleats and extended from a pontoon side of such scraper cleats.

28. An amphibious all-terrain tracklaying vehicle as described in claim 27 wherein the step cleats have at least two steps comprised of solid material.

29. An amphibious all-terrain tracklaying vehicle as described in claim 27 wherein the step cleats have at least two steps, a base step being comprised of solid material and a final step being comprised of resilient material.

30. An amphibious all-terrain tracklaying vehicle as described in claim 27 wherein the step cleats have at least two steps, a base step being hollow for buoyancy and a final step being comprised of resilient material.

31. An amphibious all-terrain tracklaying vehicle as described in claim 27 wherein the step cleats have at least two steps which are hollow for buoyancy and further comprising:
  machinery attachments proximate the front and aft ends of the deck.

32. An amphibious all-terrain tracklaying vehicle comprising:
  a pontoon hull;
  two endless tracks surrounding the pontoon hull linearly in juxtaposed relationship;
  step cleats on the endless tracks extended from proximate each side to proximate a liner center of the pontoon hull;
  track chains attached to the endless tracks in chain-drive relationship;
  track-drive sprocket wheels in track-rotation relationship to the track chains and to a rotational power source at an aft end of the pontoon hull;
  front sprocket wheels in rotational track-support relationship to the track chains at a front end of the pontoon hull;
  a deck positioned vertically above the pontoon hull such that the endless tracks are traversable between the pontoon hull and the deck;
  a track-drive sprocket wheel having a double-ended axle with a bearing member positional on a bearing section of each end of the double-ended axle;
  an axle step to which a track-drive sprocket wheel is attachable rigidly adjacent to each bearing section;
  a bearing housing attachable to each bearing member by means of matching half-shells;
  an axle keeper attachable to each end of the double-ended axle by means of at least one fastener bolt threadable into each end of the double-ended axle;
  deck suspension means attachable to each bearing housing;
  the axle keeper attachable to at least one end of two of the double-ended axles being a drive-chain sprocket wheel having sprocket teeth engageable with a drive chain in chain-drive relationship to the rotation power source;
  the deck suspension means being a spring member having a horizontal section attachable to the deck, a vertical section attachable to the bearing housing, a quarter-circle-arc section between the horizontal section and the vertical section that is sufficiently thick in proportion to length to resist vertical travel resulting from anticipated weight on the deck, and a vertical-spring section between the quarter-circle-arc section and the vertical section attachable to the bearing housing, the vertical-spring section be designed to provide desired tension in an arc tangent to vertical attachment of the spring member to the bearing housing;
  the vertical section of such spring member being attached to such bearing housing at each end of each of such double-ended axles at the front end and at the back end of the pontoon hull;
  front spring members having the horizontal section attached to a front portion of the deck with the quarter-circle-arc section positioned forwardly from the horizontal section;
  rear spring members having the horizontal section attached to an aft portion of the deck with the quarter-circle-arc section positioned rearwardly from the horizontal section;
  deck-support members extended between the pontoon hull and the deck at positions outward selectively from edges of the endless tracks; and
  the double-ended axles are reversible end-to-end such that the drive-chain sprocket wheels are positional optionally on ends of the double-ended axles proximate either an aft center or proximate aft corners of the deck in chain-driven relationship to the rotational power source.

33. An amphibious all-terrain tracklaying vehicle as described in claim 32 and further comprising:
  track-chain grooves in top and bottom surfaces of the pontoon hull;
  at least one scraper cleat having at least one cleaning orifice;
  at least one scraper blade extended from a pontoon side of the scraper cleat at a position proximate a linear-traverse side of the cleaning orifice;
  a plurality of at least three track chains on each endless track;
  at least two scraper cleats with each having a cleaning orifice extended between each track chain, making a total of at least two cleaning orifices in each of the scraper cleats;
  a scraper blade positioned on an aft side of the cleaning orifices of at least one scraper cleat and extended from a pontoon side of such scraper cleat;
  a cleaning slot in each end of each scraper cleat;
  the cleaning slot being parallel to the cleaning orifice in each scraper cleat and extended to proximate an adjacent track chain; and
  a scraper blade positioned on an aft side of each cleaning slot of the scraper cleats and extended from a pontoon side of such scraper cleats.

34. An amphibious all-terrain tracklaying vehicle as described in claim 33 wherein the step cleats have at least two steps comprised of solid material.

35. An amphibious all-terrain tracklaying vehicle as described in claim 33 wherein the step cleats have at least two steps, a base step being comprised of solid material and a final step being comprised of resilient material.

36. An amphibious all-terrain tracklaying vehicle as described in claim 33 wherein the step cleats have at least two steps, a base step being hollow for buoyancy and a final step being comprised of resilient material.

37. An amphibious all-terrain tracklaying vehicle as described in claim 33 wherein the step cleats have at least two steps which are hollow for buoyancy and further comprising:
  machinery attachments proximate the front and aft ends of the deck.

* * * * *